United States Patent
Bai et al.

(10) Patent No.: US 9,638,857 B2
(45) Date of Patent: May 2, 2017

(54) MODE SIZE ADJUSTING FOR EDGE COUPLING DEVICES USING MULTIPLE INVERSE TAPERS

(71) Applicant: Futurewei Technologies, Inc., Plano, TX (US)

(72) Inventors: Yu Sheng Bai, San Jose, CA (US); Huapu Pan, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 137 days.

(21) Appl. No.: 14/525,383

(22) Filed: Oct. 28, 2014

(65) Prior Publication Data

US 2015/0117813 A1    Apr. 30, 2015

Related U.S. Application Data

(60) Provisional application No. 61/896,418, filed on Oct. 28, 2013.

(51) Int. Cl.
*G02B 6/12* (2006.01)
*G02B 6/30* (2006.01)
*G02B 6/122* (2006.01)

(52) U.S. Cl.
CPC .......... *G02B 6/1228* (2013.01); *G02B 6/305* (2013.01)

(58) Field of Classification Search
CPC ...... G02B 6/268; G02B 6/2804; G02B 6/305; G02B 6/1228
USPC ......................... 385/14, 24, 39–49
See application file for complete search history.

(56) References Cited

U.S. PATENT DOCUMENTS

| | | | | |
|---|---|---|---|---|
| 4,684,156 A * | 8/1987 | Rhodes | ............... | F16L 37/138 285/27 |
| 5,854,868 A * | 12/1998 | Yoshimura | ............ | B82Y 20/00 385/14 |
| 7,327,771 B2 * | 2/2008 | Kim | .................. | G02B 6/12004 372/50.1 |
| 7,532,784 B2 * | 5/2009 | Tolshikhin | ........ | G02B 6/12007 385/14 |
| 8,873,899 B2 * | 10/2014 | Anderson | .............. | G02B 6/27 385/11 |
| 9,122,006 B1 * | 9/2015 | Roth | .................... | G02B 6/126 |

(Continued)

FOREIGN PATENT DOCUMENTS

EP    2610657 A1    7/2013
WO    2008014606 A1    2/2008

OTHER PUBLICATIONS

Hatori, et al., "A Novel Spot Size Convertor for Hybrid Integrated Light Sources on Photonics-Electronics Convergence System," ThB2 (Contributed Oral), 2012 IEEE 9th International Conference on Group IV Photonics (GFP), 2012, pp. 171-173.

(Continued)

*Primary Examiner* — Akm Enayet Ullah
(74) *Attorney, Agent, or Firm* — Conley Rose, P.C.

(57) ABSTRACT

An apparatus comprising a waveguide along a longitudinal axis at a first elevation, an optical splitter coupled to a first edge of the waveguide along the longitudinal axis, two or more inverse tapers coupled to a second edge of the optical splitter along the longitudinal axis, and one or more offset inverse tapers that are substantially parallel with the two or more inverse tapers, wherein the one or more offset inverse tapers are along the longitudinal axis at a second elevation.

21 Claims, 5 Drawing Sheets

(56) References Cited

U.S. PATENT DOCUMENTS

| | | | | |
|---|---|---|---|---|
| 9,329,344 B2* | 5/2016 | Anderson | | G02B 6/27 |
| 2003/0188279 A1* | 10/2003 | Doddi | | G06Q 50/04 |
| | | | | 702/189 |
| 2004/0236153 A1* | 11/2004 | Kunos | | A61K 31/047 |
| | | | | 568/659 |
| 2005/0129402 A1* | 6/2005 | Kim | | G02B 6/12004 |
| | | | | 398/79 |
| 2006/0115200 A1* | 6/2006 | Van Der Vliet | | G02B 6/1228 |
| | | | | 385/12 |
| 2009/0324163 A1* | 12/2009 | Dougherty | | B82Y 20/00 |
| | | | | 385/14 |
| 2010/0322555 A1* | 12/2010 | Vermeulen | | G02B 6/12007 |
| | | | | 385/28 |
| 2013/0188910 A1* | 7/2013 | Tokushima | | G02B 6/1228 |
| | | | | 385/28 |
| 2013/0236153 A1* | 9/2013 | Rochette | | G02B 6/2552 |
| | | | | 385/146 |
| 2015/0180201 A1* | 6/2015 | Zhang | | H01S 3/005 |
| | | | | 372/20 |
| 2015/0295675 A1* | 10/2015 | Sugama | | G02B 6/42 |
| | | | | 398/65 |
| 2016/0131842 A1* | 5/2016 | Mahgerefteh | | G02B 6/124 |
| | | | | 385/11 |

OTHER PUBLICATIONS

Roelkens, et al., "Efficient Silicon-on-Insulator Fiber Coupler Fabricated Using 248-nm-Deep UV Lighography," IEEE Photonics Technology Letters, vol. 17, No. 12, Dec. 2005, pp. 2613-2615.

Foreign Communication From a Counterpart Application, PCT Application No. PCT/US2014/062520, International Search Report dated Jan. 20, 2015, 6 pages.

Foreign Communication From a Counterpart Application, PCT Application No. PCT/US2014/062520, Written Opinion dated Jan. 20, 2015, 6 pages.

* cited by examiner

MODE SIZE ADJUSTING FOR EDGE COUPLING DEVICES USING MULTIPLE INVERSE TAPERS

CROSS-REFERENCE TO RELATED APPLICATIONS

The present application claims benefit of U.S. Provisional Patent Application No. 61/896,418 filed Oct. 28, 2013 by Yu Sheng Bai, et al. and entitled "Adjusting Mode Size and Shape In Edge Coupling Device," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In optical transceivers, photonic integrated circuits (PICs) interface with other optical components such as fibers, lasers, and other PICs. Edge coupling is an approach that allows a PIC to interface with other optical components. Typically, mode sizes in PIC waveguides are very small. Mode size refers to the dimension of a mode in an optical waveguide in a certain direction, for example, the energy distribution in the transverse direction. For example, the mode size of a typical 450 nanometer (nm) by 220 nm waveguide in a silicon-photonic-based PIC is about the size of the waveguide itself, which is much smaller than the mode diameter of a standard 9.2 micrometer (μm) single-mode fiber. Additionally, there are often differences in mode shape between the PIC waveguides and other optical components such as lasers. Mode shape refers to the relative dimension of the mode size in two different directions, for example, a horizontal direction and a vertical direction. An optical signal comprises one or more information signals (e.g., data signals) that are imposed onto optical wavelengths. For example, an optical wavelength may be in the visible spectrum or near infrared, for example, from about 850 nm to about 1650 nm. Optical signal that are allowed to travel through a waveguide are referred to as modes (e.g., modes of light) and groups of allowed modes form bands. A waveguide has a finite number of guided propagation modes which can support one or more modes. For example, a single mode waveguide has a single guided mode per polarization direction. The number of modes, the transverse profile amplitude of the modes, and the propagation constants for the modes depend on the waveguide structure and the wavelength of an optical signal. An improper horizontal to vertical ratio of the mode shape can reduce coupling efficiency. Previously, a single inverse taper structure has been used to expand the mode of a waveguide. However, the waveguide thickness and width are the only parameters to change the mode size and/or mode shape, which limits the extent that the mode size and mode shape can be changed. Thus, it is desirable to have an edge coupling device with the ability to adjust the mode size and/or mode shape of a PIC waveguide to match the mode size and/or mode shape of an optical component that is coupled to a PIC to improve coupling efficiency.

SUMMARY

In one embodiment, the disclosure includes an apparatus comprising a waveguide along a longitudinal axis at a first elevation, an optical splitter coupled to a first edge of the waveguide along the longitudinal axis, two or more inverse tapers coupled to a second edge of the optical splitter along the longitudinal axis, and one or more offset inverse tapers that are substantially parallel with the two or more inverse tapers, wherein the one or more offset inverse tapers are along the longitudinal axis at a second elevation.

In another embodiment, the disclosure includes an apparatus comprising a waveguide configured to receive an optical signal, an optical splitter coupled to the waveguide and configured to receive the optical signal from the waveguide at a first edge of the optical splitter along a longitudinal axis, two or more inverse tapers coupled to the optical splitter and configured to receive a portion of the optical signal from the optical splitter, wherein the two or more inverse tapers receive the optical signal from a second edge of the optical splitter along the longitudinal axis, and one or more offset inverse tapers in optical communication with the two or more inverse tapers and configured to receive the optical signal from the two or more inverse tapers using optical coupling, wherein the one or more offset inverse tapers are substantially parallel with the two or more inverse tapers at a second elevation.

In yet another embodiment, the disclosure includes a mode configuring method comprising providing a waveguide along a longitudinal axis at a first elevation, coupling a first edge of an optical splitter to the waveguide along the longitudinal axis, coupling two or more inverse tapers to a second edge of the optical splitter along the longitudinal axis, and providing one or more offset inverse tapers that are substantially parallel with the two or more inverse tapers, wherein the one or more offset inverse tapers are along the longitudinal axis at a second elevation.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for configuring a mode size and/or a mode shape for an edge coupling device. In an embodiment, an edge coupling device is configured such that a waveguide is split into a plurality of inversely tapered waveguides in both the vertical direction and the horizontal direction. Adjusting the number or position of the inverse tapers allows the edge coupling device to provide a variety of mode shapes and/or mode sizes. Adjusting the mode size and/or mode shape allows the edge coupling device to best match the mode of other optical components, which may improve coupling efficiency between a PIC and another optical component (e.g., a fiber or a laser). The width and thickness of each inversely tapered waveguide can be adjusted to modify the mode size and mode shape of the edge coupling device.

Figure 1:
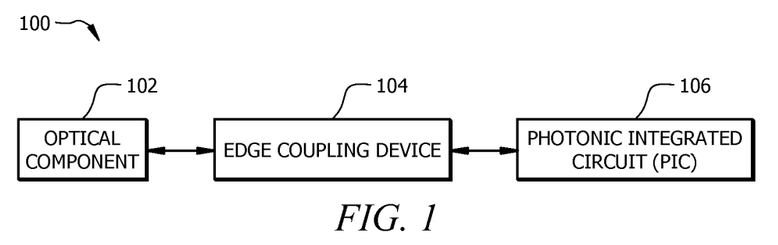
FIG. 1 is a schematic diagram of an embodiment of an optical system.

FIG. 1 is a schematic diagram of an embodiment of an optical system 100 where an embodiment of the present disclosure may operate. System 100 comprises an optical component 102, an edge coupling device 104, and a PIC 106. System 100 is configured to communicate optical signals between the optical component 102 and the PIC 106 via the edge coupling device 104. Optical component 102 may include, but is not limited to, a fiber, a laser diode, a light emitting diode (LED), a PIC, a waveguide, a fiber coupler, a fiber connector, and a fiber collimator. Edge coupling device 104 is configured to communicate an optical signal between the optical component 102 and the PIC 106. For example, edge coupling device 104 is configured to receive an optical signal from optical component 102 and to split and/or distribute the optical signal among a plurality of inversely tapered waveguides. Changing the number and/or position of the inverse tapers adjusts the mode size and/or the mode shape in a vertical direction and/or a horizontal direction for an optical signal that is being communicated between the optical component 102 and the PIC 106. Adjusting the mode size and/or mode shape of the optical signal allows improved matching between the optical component 102 and the PIC 106, and thereby improves the coupling efficiency between the optical component 102 and the PIC 106. Edge coupling device 104 is configured similarly to edge coupling device 200, which is described in FIG. 2. PIC 106 is configured to perform one or more photonic functions on an optical signal. A PIC refers to a semiconductor chip that integrates multiple optical or opto-electronic components. These functions include, but are not limited to, amplifying, multiplexing, demultiplexing, and converting from an optical signal to an electrical signal.

Figure 2:
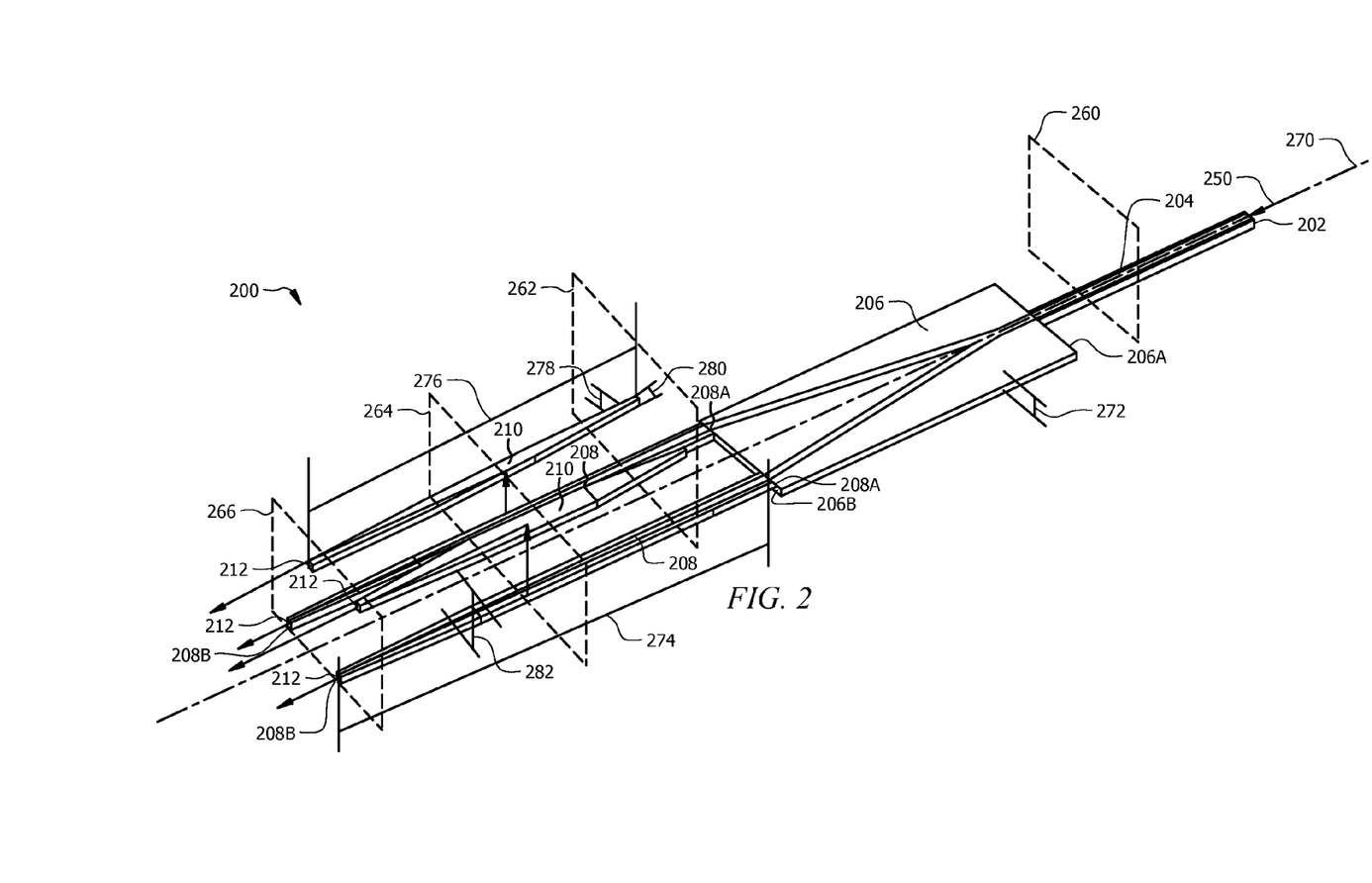
FIG. 2 is a perspective view of an embodiment of an edge coupling device.

FIG. 2 is a perspective view of an embodiment of an edge coupling device 200 that may be used to communicate an optical signal 250 between an optical component and a PIC, for example, between optical component 102 and PIC 106 described in FIG. 1. Edge coupling device 200 is configured such that the optical signal 250 can flow bidirectionally between an optical component and a PIC. Material structures for realizing edge coupling device 200 include, but are not limited to, silicon (Si), silicon mononitride (SiN), and indium phosphide (InP). For example, edge coupling device 200 may be realized using Si with a thickness 272 of about 220 nm. Alternatively, edge coupling device 200 may be realized using any other thickness or material as would be appreciated by one of ordinary skill in the art upon viewing this disclosure. For example, a material thickness may be the smallest thickness allowed by a fabrication process.

Edge coupling device 200 comprises a waveguide 204, an optical splitter 206, a pair of inverse tapers 208, and a pair of offset inverse tapers 210. In an alternative embodiment, the edge coupling device 200 can comprise any other number of inverse tapers 208 and offset inverse tapers 210. Waveguide 204 is positioned along a longitudinal axis 270 at a first elevation. In an embodiment, waveguide 204 is configured to receive an optical signal 250 (e.g., from an optical component) at a first end 202 of the edge coupling device 200.

Optical splitter 206 is configured to receive the optical signal 250 from the waveguide 204 at a first edge 206A of the optical splitter 206 along the longitudinal axis 270 and to output the optical signal 250 at a second edge 206B of the optical splitter 206 along the longitudinal axis 270. Optical splitter 206 is configured to split or distribute a light path into a plurality of light paths. For example, optical splitter 206 is configured to split the optical signal 250 light path from the waveguide 204 into a light path for each of the inverse tapers 208. Optical splitter 206 includes, but is not limited to, a multi-mode interferometer (MMI), a Y-junction, a directional coupler, or a 1×M junction, where M is an integer greater than one. In an embodiment, the optical splitter 206 has a width of about 450 nm.

Inverse tapers 208 are configured to receive the optical signal 250 from the second edge 206B of the optical splitter 206 and to output the optical signal 250 at a second end 212 of the edge coupling device 200. In an embodiment, the inverse tapers 208 are spaced an equal distance apart from each other (e.g., equidistant spacing). The tip width of the inverse tapers 208 is configured to minimize optical losses. For example, each inverse taper 208 has a tip width of about 130 nm. The thickness and width of each inverse taper 208 can be adjusted independently of the other inverse tapers 208. In another embodiment, the inverse tapers 208 can be positioned in any other configuration and/or with any other spacing along the second edge 206B of the optical splitter 206 as would be appreciated by one of ordinary skill in the art upon viewing this disclosure. Inverse tapers 208 are configured such that a first end 208A of the inverse tapers 208 that is coupled to the second edge 206B of the optical splitter 206 is wider than a second end 208B of the inverse tapers 208. The length 274 of the inverse tapers 208 is sufficient to support an adiabatic tapering process along the inverse taper 208 from the second edge 206B of the optical splitter 206 to the second end 208B of the inverse tapers 208. In adiabatic tapering, the length of a waveguide (e.g., inverse tapers 208) is sufficiently long enough that the waveguide does not induce higher-order modes into an optical signal 250. For example, the length 274 of the inverse tapers 208 is at least 200 µm.

Offset inverse tapers 210 are configured to receive the optical signal 250 from the inverse tapers 208 using optical coupling and to output the optical signal at the second end 212 of edge coupling device 200. In an embodiment, offset inverse tapers 210 comprise a structure similar to inverse tapers 208. The shape and/or length 276 of the offset inverse tapers 210 is sufficient to support adiabatic tapering and to minimize optical losses. For example, each offset inverse taper 210 has a length 276 of about 200 µm, a thickness 278 of about 220 nm, and a tip width 280 of about 130 nm. The thickness 278 and/or width 280 of each offset inverse taper 210 can be adjusted independently of the other offset inverse tapers 210 and independently of the inverse tapers 208. Offset inverse tapers 210 are positioned substantially parallel to the inverse tapers 208 at a second elevation. For instance, offset inverse tapers 210 are positioned above the inverse tapers 208. In an alternative embodiment, one or more offset inverse tapers 210 can be positioned above and/or below the inverse tapers 208. The word "parallel" may mean substantially parallel. In an alternative embodiment, offset inverse tapers 210 are not substantially parallel and may be configured in any other suitable orientation as would be appreciated by one of ordinary skill in the art upon viewing this disclosure. An offset inverse taper 210 may be substantially vertically aligned with a corresponding inverse taper 208 or may be offset from the inverse tapers 208. Offset inverse tapers 210 and inverse tapers 208 may be separated from each other using any suitable spacing 282 and/or material (e.g., dielectric) as would be appreciated by one of ordinary skill in the art upon viewing this disclosure. For example, offset inverse tapers 210 are separated from inverse tapers 208 using silicon dioxide ($SiO_2$) with a spacing 282 of about 1 µm. The mode size and/or mode shape of the optical signal 250 is adjusted and/or modified by the configuration of offset inverse tapers 210 and inverse tapers 208. Different mode sizes and mode shapes can be realized by adjusting the width, height, spacing, and/or number of output waveguides (e.g., offset inverse tapers 210 and inverse tapers 208) as would be appreciated by one of ordinary skill in the art upon viewing this disclosure.

Figure 3:
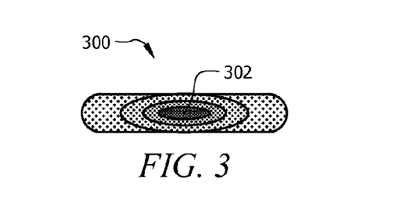
FIG. 3 is a mode profile of an embodiment of a cross section for a waveguide of an edge coupling device.

FIG. 3 is a mode profile for an embodiment of a cross section 300 of an edge coupling device waveguide. A mode profile refers to an energy density distribution for a waveguide. For example, cross section 300 corresponds with cross section 260 of waveguide 204 described in FIG. 2. Cross section 300 illustrates a mode shape and a mode size for a waveguide portion 302 (e.g., waveguide 204 described in FIG. 2) of an edge coupling device (e.g., edge coupling device 200 described in FIG. 2). Cross section 300 shows a rectangular energy density distribution for the edge coupling device around waveguide 302.

Figure 4:
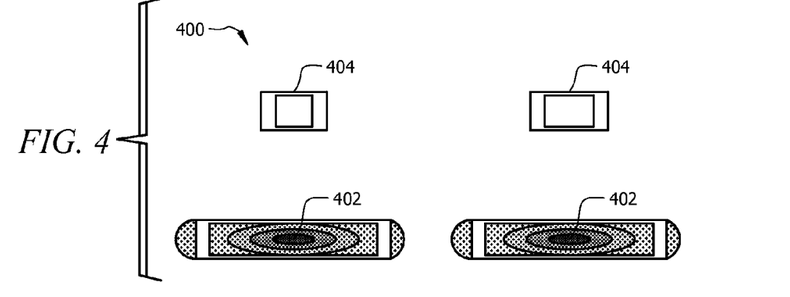
FIG. 4 is a mode profile of an embodiment of a cross section for inverse tapers and offset inverse tapers of an edge coupling device.

FIG. 4 is a mode profile for an embodiment of a cross section 400 of an edge coupling device offset inverse tapers and inverse tapers. For example, cross section 400 corresponds with cross section 262 of offset inverse tapers 210 and inverse tapers 208 described in FIG. 2. Cross section 400 illustrates a mode shape and a mode size for a plurality of offset inverse tapers 404 (e.g., offset inverse tapers 210 described in FIG. 2) and a plurality of inverse tapers 402 (e.g., inverse tapers 208 described in FIG. 2) of an edge coupling device (e.g., edge coupling device 200 described in FIG. 2). Cross section 400 shows a rectangular energy density distribution around each of the inverse tapers 402, which provides a rectangular energy density distribution for the edge coupling device at a first elevation level.

Figure 5:
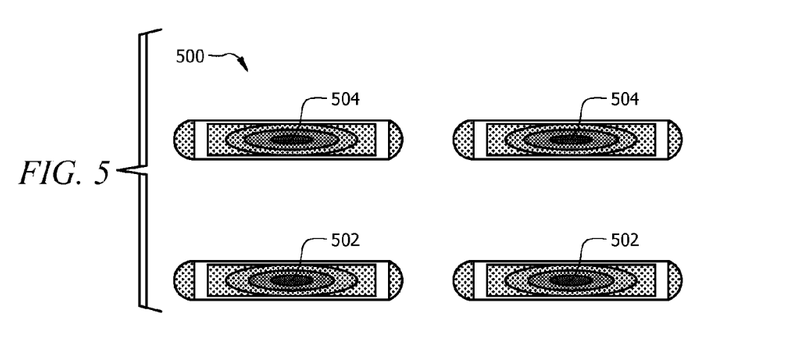
FIG. 5 is a mode profile of another embodiment of a cross section for inverse tapers and offset inverse tapers of an edge coupling device.

FIG. 5 is a mode profile for another embodiment of a cross section 500 of an edge coupling device offset inverse tapers and inverse tapers. For example, cross section 500 corresponds with cross section 264 of offset inverse tapers 210 and inverse tapers 208 described in FIG. 2. Cross section 500 illustrates a mode shape and a mode size for a plurality of offset inverse tapers 504 (e.g., offset inverse tapers 210 described in FIG. 2) and a plurality of inverse tapers 502 (e.g., inverse tapers 208 described in FIG. 2) of an edge coupling device (e.g., edge coupling device 200 described in FIG. 2). Cross section 500 shows a rectangular energy distribution around each of the offset inverse tapers 504 and the inverse tapers 502, which combine to provide a rectangular energy density distribution for the edge coupling device.

Figure 6:
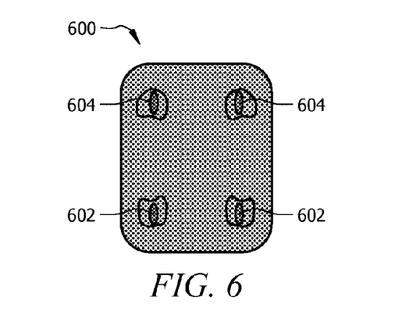
FIG. 6 is a mode profile of another embodiment of a cross section for inverse tapers and offset inverse tapers of an edge coupling device.

FIG. 6 is a mode profile for another embodiment of a cross section 600 for a plurality of offset inverse tapers and a plurality of inverse tapers of an edge coupling device. For example, cross section 600 corresponds with cross section 266 of offset inverse tapers 210 and inverse tapers 208 described in FIG. 2. Cross section 600 illustrates a mode shape and a mode size for a plurality of offset inverse tapers 604 (e.g., offset inverse tapers 210 described in FIG. 2) and a plurality of inverse tapers 602 (e.g., inverse tapers 208 described in FIG. 2) of an edge coupling device (e.g., edge coupling device 200 described in FIG. 2). Cross section 600 shows about a square energy distribution around each of the offset inverse tapers 604 and the inverse tapers 602, which combine to provide about a square energy distribution for the edge coupling device.

Figure 7:
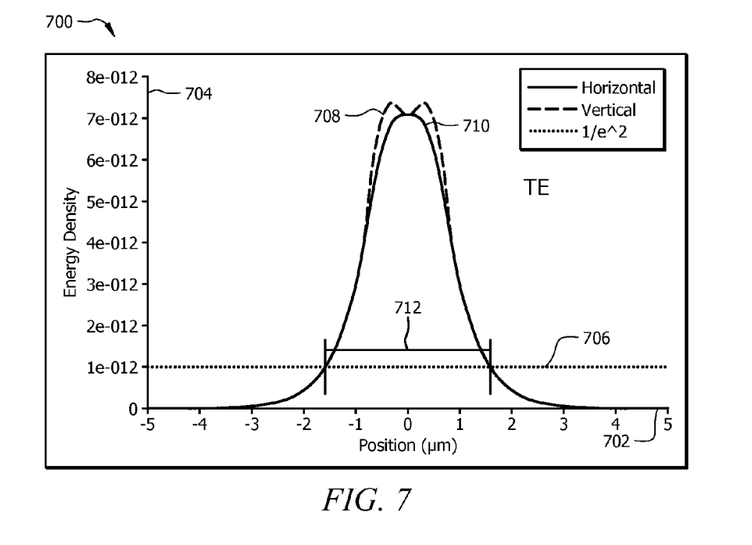
FIG. 7 is an energy density graph of an embodiment of a transverse electric mode polarization for an edge coupling device.

FIG. 7 is an energy density graph 700 of an embodiment of a transverse electric (TE) mode polarization for a plurality of offset inverse tapers (e.g., offset inverse tapers 210 described in FIG. 2) and a plurality of inverse tapers (e.g., inverse tapers 208 described in FIG. 2) for an edge coupling device (e.g., edge coupling device 200 described in FIG. 2). In an embodiment, an edge coupling device comprises a pair of offset inverse tapers and a pair of inverse tapers. The offset inverse tapers and the inverse tapers are configured with a width of about 130 nm and a thickness of about 220 nm. The offset inverse tapers and the inverse tapers are configured in a square shape configuration with equidistant spacing of about 1 µm between the offset inverse tapers and the inverse tapers. For example, the offset inverse tapers and the inverse tapers are configured similarly to cross section 600 shown in FIG. 6. Energy density graph 700 illustrates a horizontal TE mode polarization energy density 710, a vertical TE mode polarization energy density 708, and a $$\frac{1}{e^2}$$

mode field diameter (MFD) 706 for an optical signal. The $$\frac{1}{e^2}$$

MFD defines the size of an optical mode. The mode field diameter is the distance measured between the two points where the $$\frac{1}{e^2}$$

relative optical intensity falls to of the optical intensity, for example, the mode diameter is indicated by 712. The optical signal has a wavelength of about 1550 nm. Axis 702 indicates relative position offsets with respect to a centralized point between a plurality of offset inverse tapers and inverse tapers. Axis 704 indicates relative energy density levels. The horizontal TE mode polarization energy density 710 and the vertical TE mode polarization energy density 708 have a width 712 of about 3 μm, which facilitates coupling to optical components with larger mode sizes. As such, the mode field diameter is about equal in the horizontal direction and in the vertical direction. The energy density tails for the horizontal TE mode polarization energy density 710 and the vertical TE mode polarization energy density 708 is sharp, which indicates reduced optical leakage to other optical guide layers such as the substrate.

Figure 8:
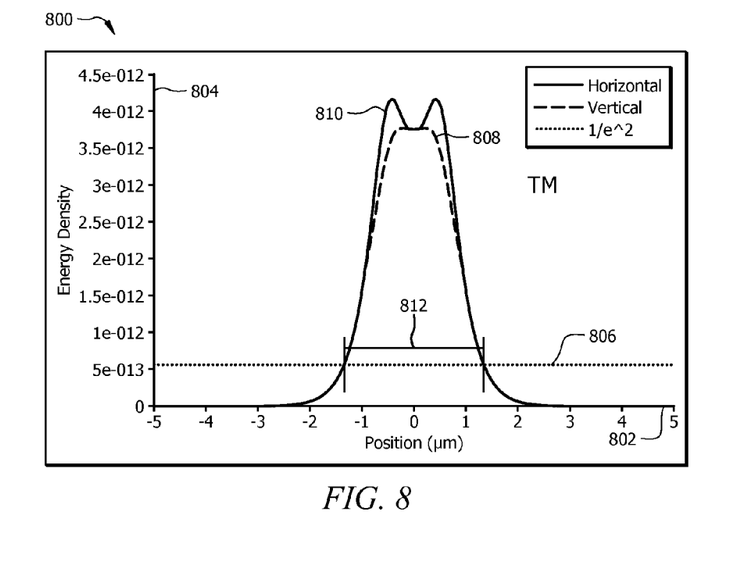
FIG. 8 is an energy density graph of an embodiment of a transverse magnetic mode polarization for an edge couple device.

FIG. 8 is an energy density graph 800 of an embodiment of a transverse magnetic (TM) mode polarization for an edge coupling device, for example, edge coupling device 200 described in FIG. 2. In an embodiment, the edge coupling device, the offset inverse tapers, and the inverse tapers are configured similarly to what is described for FIG. 7. Energy density graph 800 illustrates a horizontal TM mode polarization energy density 810, a vertical TM mode polarization energy density 808, and a $$\frac{1}{e^2}$$

MFD 806 for an optical signal. The optical signal has a wavelength of about 1550 nm. Axis 802 indicates relative position offsets with respect to a centralized point between a plurality of offset inverse tapers and inverse tapers. Axis 804 indicates energy density levels. The mode field diameter can be determined similarly to as described in FIG. 7. The horizontal TM mode polarization energy density 810 and the vertical TM mode polarization energy density 808 have a width 812 of about 3 μm, which facilitates coupling to optical components with larger mode sizes. As such, the mode field diameter is about equal in the horizontal direction and in the vertical direction. The energy density tails for the horizontal TM mode polarization energy density 810 and the vertical TM mode polarization energy density 808 is sharp, which indicates reduced optical leakage to other optical guide layers such as the substrate.

Figure 9:
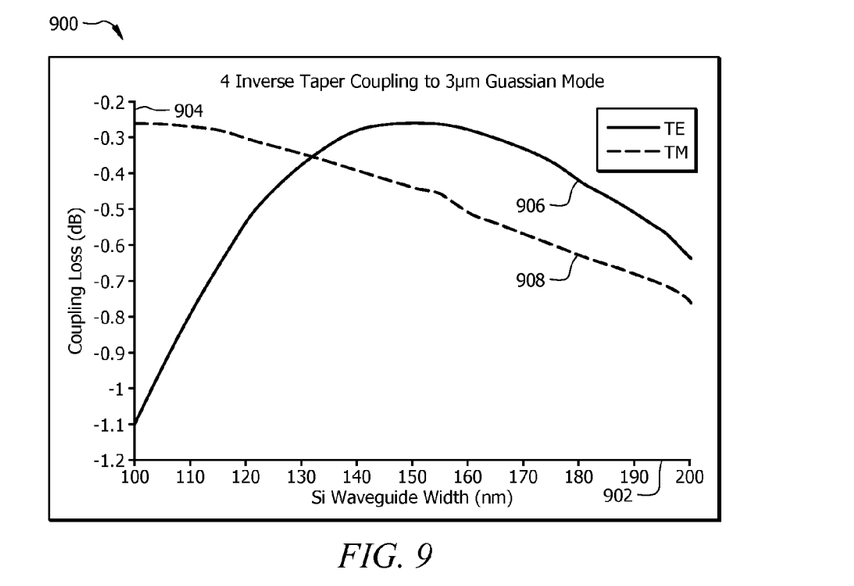
FIG. 9 is a graph of an embodiment of coupling losses for an edge coupling device.

FIG. 9 is a graph 900 of an embodiment of coupling losses for an edge coupling device, for example, edge coupling device 200 described in FIG. 2. In an embodiment, the edge coupling device, the offset inverse tapers, and the inverse tapers are configured similarly to what is described for FIG. 7. Graph 900 illustrates coupling losses of an edge coupling device to a 3 μm Gaussian mode for a TE mode and a TM mode. The coupling losses are measured using an optical signal with a wavelength of about 1550 nm. In particular, graph 900 illustrates TE mode coupling losses 906 and TM mode coupling loses 908. Axis 902 indicates an Si waveguide width in nm for an Si waveguide with a thickness of about 220 nm. Axis 904 indicates coupling losses in decibels (dBs). The TE mode coupling losses 906 and the TM mode coupling loses 908 demonstrate improved coupling efficiency due to an enlarged mode size. Also, the sensitivity of coupling losses to the Si waveguide width is reduced. Graph 900 demonstrates that a mode profile for a plurality of offset inverse tapers and a plurality of inverse tapers correlates with the number and/or position of the offset inverse tapers and the inverse tapers rather than the width and thickness of the offset inverse tapers and the inverse tapers.

Figure 10:
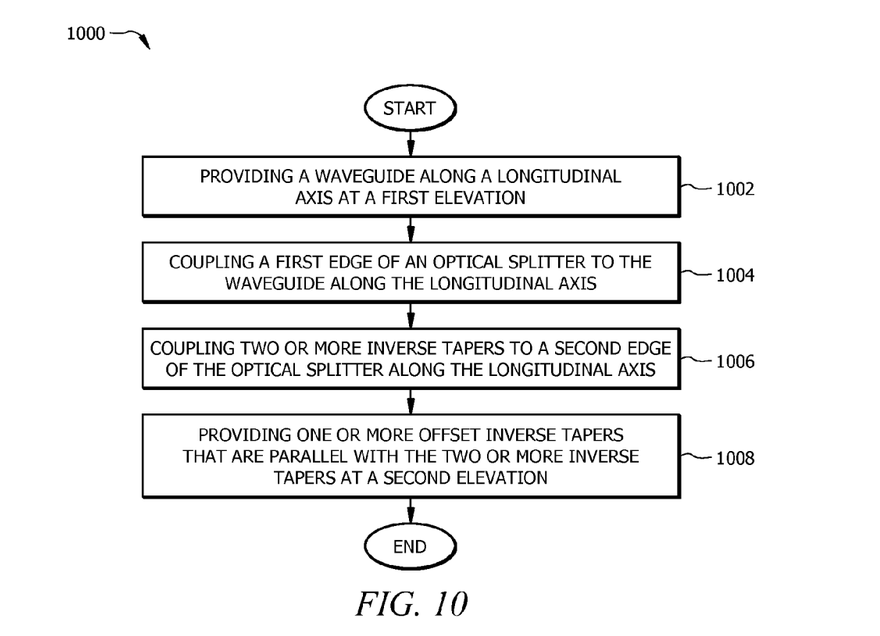
FIG. 10 is a flowchart of an embodiment of a mode adjusting method for an edge couple device.

FIG. 10 is a flowchart of an embodiment of a mode adjusting method 1000 for an edge couple device. In an embodiment, mode adjusting method 1000 produces an edge coupling device that allows a mode size and/or a mode shape to be adjusted for communicating optical signals. For example, method 1000 produces an edge coupling device that is configured to interface between an optical component and a PIC (e.g., optical component 102 and PIC 106 described in FIG. 1) and to adjust the mode size and/or the mode shape of an optical signal that is being sent between the optical component and the PIC. An edge coupling device may be configured similarly to edge coupling device 200 described in FIG. 2. At step 1002, a waveguide (e.g., waveguide 204 described in FIG. 2) is provided along a longitudinal axis at a first elevation. The waveguide is configured to receive an optical signal along the longitudinal axis at a first end of the edge coupling device. At step 1004, a first edge of an optical splitter (e.g., optical splitter 206 described in FIG. 2) is coupled to the waveguide along the longitudinal axis. The optical splitter is configured to receive the optical signal from the waveguide at the first edge of the optical splitter along the longitudinal axis and to split or distribute the light path of the optical signal into a plurality of light paths. At step 1006, two or more inverse tapers (e.g., inverse tapers 208 described in FIG. 2) are coupled to a second edge of the optical splitter along the longitudinal axis. The two or more inverse tapers are configured to receive the optical signal from the second edge of the optical splitter along the longitudinal axis. At step 1008, one or more offset inverse tapers (e.g., offset inverse tapers 210 described in FIG. 2) are provided at a second elevation and are substantially parallel to the two or more inverse tapers. The one or more offset inverse tapers are configured to receive the optical signal from the two or more inverse tapers using optical coupling and to output the optical signal along the longitudinal axis to a second edge of the edge coupling device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:
1. An apparatus comprising:
   a waveguide along a longitudinal axis at a first elevation;
   an optical splitter coupled to a first edge of the waveguide along the longitudinal axis and at the first elevation;

two or more inverse tapers coupled to couple to the optical splitter at a second edge of the optical splitter along the longitudinal axis and at the first elevation; and one or more offset inverse tapers that are substantially parallel with the two or more inverse tapers, wherein the one or more offset inverse tapers are along the longitudinal axis at a second elevation.

2. The apparatus of claim 1, wherein the two or more inverse tapers support adiabatic tapering.

3. The apparatus of claim 1, wherein the one or more offset inverse tapers are positioned to allow optical coupling with the two or more inverse tapers.

4. The apparatus of claim 1, wherein each of the one or more offset inverse tapers is aligned with one of the inverse tapers.

5. The apparatus of claim 1, wherein the inverse tapers and the offset inverse tapers are configured to adjust a mode of an optical signal in a vertical direction and in a horizontal direction.

6. The apparatus of claim 1, wherein the two or more inverse tapers are spaced equidistance apart from each other.

7. The apparatus of claim 1, wherein the offset inverse tapers comprise two or more offset inverse tapers.

8. The apparatus of claim 1, further comprising one or more second offset inverse tapers that are parallel with the two or more inverse tapers, wherein the one or more second offset inverse tapers are along the longitudinal axis at a third elevation, wherein the second elevation is above the first elevation, and wherein the third elevation is below the first elevation.

9. An apparatus comprising:
a waveguide positioned at a first elevation and configured to receive an optical signal;
an optical splitter coupled to the waveguide and configured to receive the optical signal from the waveguide at a first edge of the optical splitter along a longitudinal axis and at the first elevation;
two or more inverse tapers coupled to the optical splitter, positioned at the first elevation, and configured to receive a portion of the optical signal from the optical splitter, wherein the two or more inverse tapers receive the optical signal from a second edge of the optical splitter along the longitudinal axis; and
one or more offset inverse tapers in optical communication with the two or more inverse tapers and configured to receive the optical signal from the two or more inverse tapers using optical coupling, wherein the one or more offset inverse tapers are substantially parallel with the two or more inverse tapers at a second elevation.

10. The apparatus of claim 9, wherein the two or more inverse tapers support adiabatic tapering.

11. The apparatus of claim 9, wherein each of the offset inverse tapers is aligned with one of the inverse tapers.

12. The apparatus of claim 9, wherein the inverse tapers and the offset inverse tapers are configured to adjust a mode of the optical signal in a vertical direction and in a horizontal direction.

13. The apparatus of claim 9, wherein the two or more inverse tapers are spaced equidistance apart from each other.

14. The apparatus of claim 9, wherein the offset inverse tapers comprise two or more offset inverse tapers.

15. The apparatus of claim 9, further comprising one or more second offset inverse tapers configured to receive the optical signal from the two or more inverse tapers using optical coupling, wherein the one or more second offset inverse tapers are parallel with the two or more inverse tapers, wherein the one or more second offset inverse tapers are along the longitudinal axis at a third elevation, wherein the second elevation is above the first elevation, and wherein the third elevation is below the first elevation.

16. The apparatus of claim 1, wherein the optical splitter is one of a multi-mode interferometer (MMI), a Y-junction splitter, a directional coupler, or a 1×M junction, and wherein M is an integer greater than one.

17. The apparatus of claim 1, wherein the optical splitter comprises a width of about 450 nanometers (nm).

18. The apparatus of claim 1, wherein the inverse tapers comprise tip widths of about 130 nanometers (nm) and lengths of about 200 micrometers (μm).

19. The apparatus of claim 1, wherein the offset inverse tapers comprise lengths of about 200 micrometers (μm), thicknesses of about 220 nanometers (nm), and tip widths of about 13 nm.

20. The apparatus of claim 1, further comprising silicon dioxide ($SiO_2$) separating the offset inverse tapers from the inverse tapers.

21. The apparatus of claim 1, wherein the inverse tapers are substantially parallel to each other along their entire lengths and with respect to the longitudinal axis.

* * * * *